Figure 4:
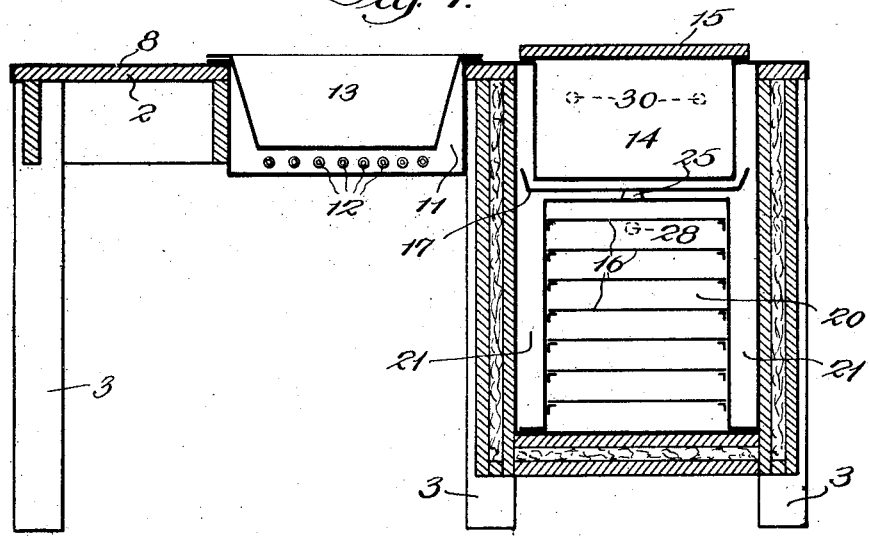

Aug. 9, 1927.  1,638,041
J. KORKAMES
COMBINED CHOCOLATE DIPPING TABLE AND COOLER
Filed May 12. 1926   3 Sheets-Sheet 1
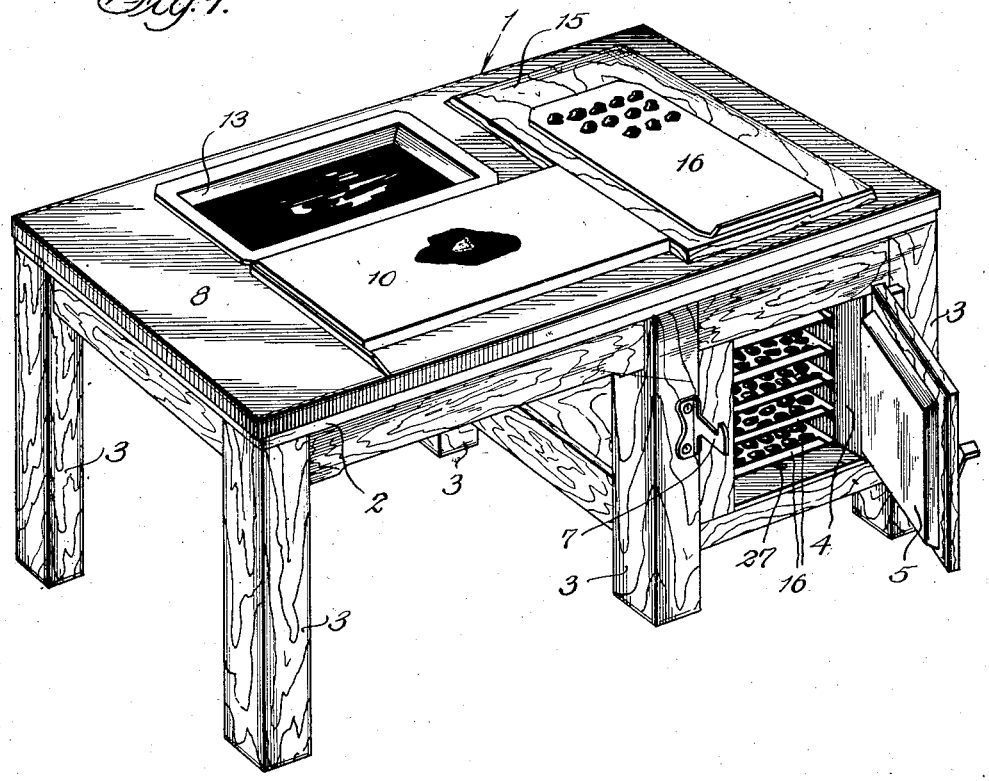
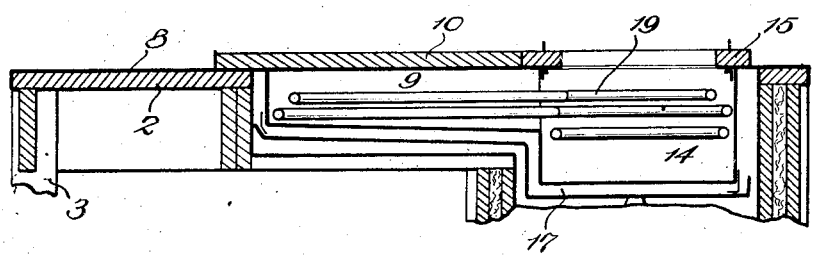
Inventor
Joe Korkames.
By Smith & Michael,
Attorneys.

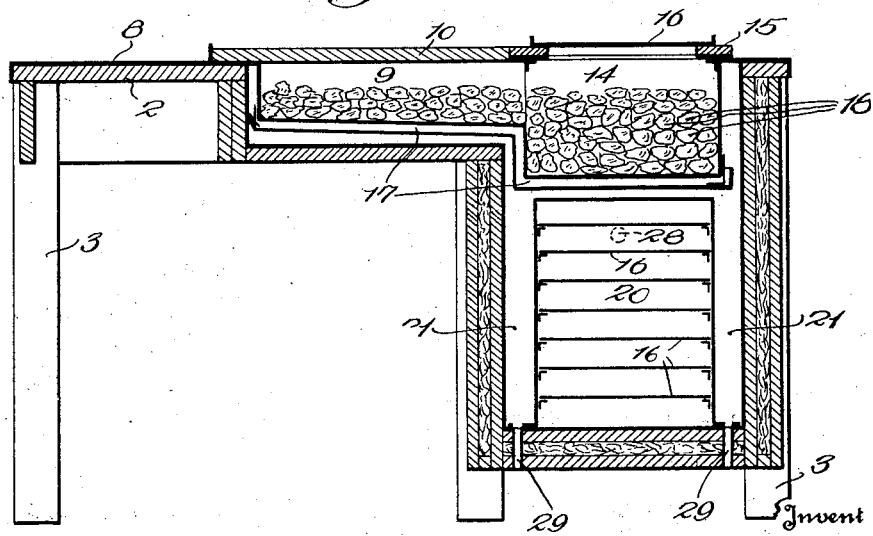

Aug. 9, 1927.

J. KORKAMES 1,638,041

COMBINED CHOCOLATE DIPPING TABLE AND COOLER

Filed May 12, 1926     3 Sheets-Sheet 3

Inventor

Joe Korkames

By Smith and Michael,
Attorneys

Patented Aug. 9, 1927.

1,638,041

UNITED STATES PATENT OFFICE.

JOE KORKAMES, OF TEMPLE, TEXAS.

COMBINED CHOCOLATE DIPPING TABLE AND COOLER.

Application filed May 12, 1926. Serial No. 108,589.

My invention relates to a combined chocolate dipping table and chocolate candy cooler, and has particular reference to a unitary structure including a chocolate melting receptacle, a cold candy-working slab on which the fancy and coated products are worked, and a storage compartment in which the finished chocolates may be placed to properly cool, set and harden.

The maintenance of a proper working and cooling temperature for chocolates is a rather difficult problem and one that requires careful consideration if a good-texture, finish and absence from "bloom" is to be secured. Before the days of refrigeration, chocolate candies were best made in the cooler months of the year when the naturally low temperature would allow the chocolate to properly set and harden. With the introduction of artificial and mechanical refrigeration, it became customary to manufacture the chocolates at ordinary room temperature and, when finished, to store the chocolates in a cold room. Another method of manufacture consists in working and cooling the chocolates in a special work room, the temperature of which has been reduced to the proper degree to insure satisfactory working and hardening conditions. Since the introduction of these methods of maintaining the proper working and cooling temperatures, many and various arrangements of coolers and special devices have been employed to enable the manufacture of fancy or coated chocolates to proceed without interruption throughout the whole year and without the necessity of suspending manufacture during the hot weather, the most satisfactory form of device being the combined working table and storage compartment. With such cabinet structures, it is not necessary to resort to the expensive methods of reducing the temperature of the entire work room, but only the working-slab and storage compartment, thus effecting a marked saving and reduction in the refrigerant or refrigerating power required. In such devices it has been customary to provide suitable storage compartments in which the finished coated products may be placed to set and harden and to cool such compartments by placing therein a block of ice or cooling coils, the air circulating around the ice or coil and around the chocolate to cool the same. In other forms of cabinet structures the cooling compartment has one or more of its sides in direct contact with ice or cooling brine, whereby the storage compartment is maintained at the proper temperature. In cabinet structures where the circulation of air over the ice or cooling coils is utilized to set or harden the chocolates it is difficult, if not impossible, to secure a satisfactory product, as the moisture from the ice or coils condenses upon the chocolates and causes a "bloom" or gray color which is highly undesirable. In the form of cabinet where a side or sides of the cooling compartment is in direct contact with the ice or cooling brine, the inner sides of the compartment collect moisture or "sweat", thus creating a moist atmosphere in the cooling compartment and causing the chocolates to "bloom" or become gray. In both of these forms of cabinets there is also the likelihood of the condensed moisture dripping on the trays and chocolates with ruinous results. It is, therefore, obvious that if satisfactory results are to be obtained, the cooling compartment must be kept absolutely dry and the cooling air free from contact with moisture bearing surfaces.

An object of my invention is to provide a combined chocolate dipping table and chocolate candy cooler, including in a single construction a melting pot or receptacle for the chocolate, a cold working slab, and a storage compartment in which the finished chocolates may be placed, and to provide a novel construction for cooling said storage compartment to maintain within the same an absolutely dry, cold atmosphere in which the chocolates will set or harden without acquiring a "bloom" or objectionable gray color.

A further object of my invention is to provide a combined chocolate dipping and candy cooler, chiefly designed to facilitate and expedite the production of fancy and coated chocolates, regardless of work-room temperature, and in which a suitable work table is provided having a plane top surface in which is positioned a chocolate melting receptacle, a cold working slab and a tray support, and to associate with this work table a suitable storage compartment in which the finished chocolates may be conveniently placed to set or harden, ice or cooling coil compartments being positioned below the working slab and above the storage compartment for maintaining the slab and compartment at the proper temperature.

A still further object of my invention is to provide a device of the above mentioned character in which the ice or cooling coil compartments for the working slab and storage are equipped with drip-trays for catching the moisture or drip collecting on the bottoms of such compartments and for conveying the same to a suitable discharge point, means also being provided to completely separate the storage compartment from direct contact with the moisture bearing surfaces of said ice or cooling coil compartments, whereby to effectively maintain a dry or moisture-free cooling atmosphere within the storage compartment.

A still further object of my invention is to provide a device of the above mentioned character that may be readily assembled and disassembled for purposes of cleaning and repair, that is simple in construction and operation, and highly efficient for the purposes for which designed.

Figure 5:
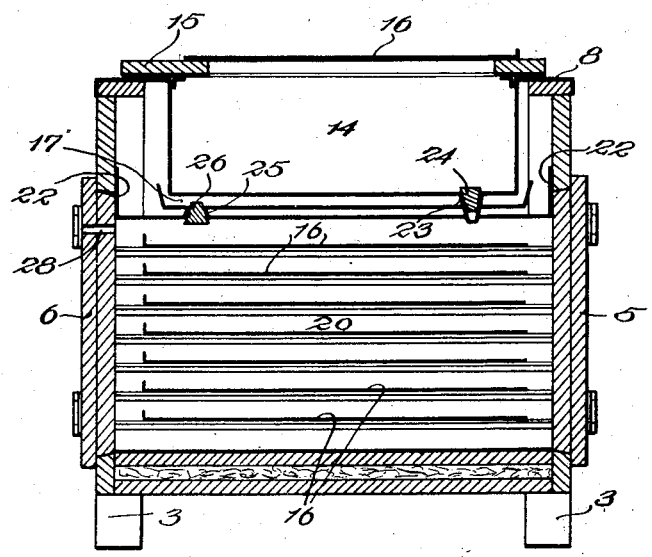

In the accompanying drawings forming a part of this specification, and in which is shown a preferred embodiment of my invention, Fig. 1 is a perspective view of my improved combined chocolate dipping table and cooler, Fig. 2 is a plan view thereof, Fig. 3 is a vertical sectional view on the line 3—3 of Fig. 2, Fig. 4 is a vertical sectional view on the line 4—4 of Fig. 2, Fig. 5 is a vertical sectional view on the line 5—5 of Fig. 2, and Fig. 6 is a fragmental vertical sectional view through the device showing the utilization of cooling coils instead of ice for cooling the working slab and storage compartment.

Referring to the accompanying drawings, wherein like reference numerals are employed to designate similar parts throughout the several views, the numeral 1 designates broadly my improved work table, comprising an open top portion 2, supported by suitable legs 3 and having at its lower right-hand side a suitable storage compartment 4, open at its front and rear sides and provided with swinging doors 5 and 6 respectively, adapted to close said compartment and to permit ready access thereto, latches 7 being provided to maintain said doors in closed position. The above described construction may be made of wood, it being understood that the height and dimensions of said work-table are such that the candy-maker may comfortably sit upon a chair positioned in front of the table and that the entire upper surface of the table and the front door 5 of the compartment 4 is within easy reach of the operator when thus seated.

The open table top 2 is completely covered by a sheet zinc or other sheet metal cover 8, provided with a depending, tray-like compartment 9, extending along the front surface of the cover and adapted to underlie the removable working slab 10, which may be of marble, metal or other material of good thermal conductivity. Immediately in rear of the compartment 9, and separated therefrom, is a second depending tray-like compartment 11, having near the bottom thereof suitable heating means 12, either gas or electric, and adapted to receive a removable chocolate melting receptacle 13. To the right of the compartment 9 and preferably formed integral therewith, is a third depending tray-like compartment 14 somewhat deeper than the compartment 9 with which it is joined, said compartment 14 extending above the storage compartment 4. Over the compartment 14 may be placed, if desired, a removable rectangular frame 15 adapted to support the individual chocolate-cooling trays 16, which trays are of a sufficient size to completely cover the opening in said frame. It will be understood by reference to the accompanying drawings that the tray-like compartments 9 and 14 are in direct communication, it being further noted that the bottom of the compartment 9 slopes toward the compartment 14.

A one-piece drip pan 17 completely underlies the tray-like compartments 9 and 14, said drip pan being slightly larger than the bottom surface of said compartments 9 and 14 and having an upturned marginal flange. When the compartments 9 and 14 are filled with ice and salt 18, as shown in Fig. 3, or when cooling coils 19 are placed within the said compartments, as shown in Fig. 6, any moisture which collects on the outer surface of such compartments drops into the underlying pan 17.

From the above description, taken in connection with the accompanying drawings, it will be seen that the melting tray 13, the working slab 10, and the tray supporting frame 15 are all detachable from the cover member 8 and may be readily removed for permitting access to the underlying heating and cooling compartments 11, 9 and 14, respectively. It is to be further noted that the removable top member 8, which has attached thereto or formed integral therewith the depending tray-like compartments 9, 11 and 14, may be removed from the table for purposes of cleaning and repair.

Within the storage space 4 of the work-table, I place a sheet metal, box-like compartment designated broadly by the reference character 20, said compartment having closed sides and a top of sufficient length to completely fill the space between the inner sides of the front and rear doors 5 and 6, respectively, of the compartment 4, when the said doors are in closed position. The width of the compartment 20 is less than the distance between the side walls of the compartment 4 within which it is located, thus providing spaces 21 on opposite sides of the compartment 20 in direct communication with the overlying space in which the compartment 14 is located. The top of the compartment 20 is provided with upturned flanges 22 at its front and rear ends, thus completely sealing the inner compartment when the front and rear doors are in closed position. The inner side walls of the compartment 20 are provided with spaced angle brackets adapted to support the individual trays 16 in parallel spaced relation within the compartment.

To enable the compartment 14 to be drained, I provide a hole through the bottom thereof near the forward end of the compartment and solder or otherwise secure around this hole a funnel-shaped depending flange 23 of a sufficient length to pass through aligned holes in the drip pan 17 and the top of the compartment 20. Into this hole I insert a plug or cork 24, and when it is desired to drain the liquid from the compartment 14, the trays 16 are removed from the storage compartment 20, a bucket or other receptacle placed in the compartment 20 below the opening in the top thereof and the plug 24 removed from the drainage opening. To enable the drip-pan 17 to be drained, I provide a hole through the top of the compartment 20 near the rear end thereof and solder or otherwise secure around this hole an upstanding tapered flange 25 of a sufficient height to pass through an aligned hole in the bottom of the drip pan 17. Into this hole I insert from the inside of the compartment 20 a plug or cork 26, and when it is desired to drain the liquid from the drip-pan 17, the trays are removed from the storage compartment 20, a bucket or other receptacle placed in the compartment 20 below the rear opening in the top thereof, and the plug 26 is removed from the drainage opening.

For properly ventilating the storage compartment 20, I cut a hole 27 through the bottom thereof and through the bottom of the compartment 4, such hole being positioned near the front edge of the compartments. To insure circulation, I provide a second ventilating opening 28 passing through the upper edge of the rear door 6, below the top portion of the compartment 20. To insure the proper ventilation and circulation of air within the side spaces 21 and around the outer surfaces of the compartment 14, I provide ventilating holes 29 passing through the bottom of the compartment 4 and communicating with the space 21, and to insure circulation, I provide the rear face of the table above the door 6 with a pair of ventilating openings 30 positioned above the top portion of the compartment 20.

Referring now to the operation of my improved device, the working slab 10 is removed from the top of the table and the compartments 9 and 14 partially filled with ice and salt mixture or other cooling medium. The work slab 10 is then replaced above the compartment 9, an empty tray 16 is placed on the frame 15 above the compartment 14, and the doors 5 and 6 tightly closed and latched. Chocolate is then placed in the receptacle 13 and the gas or electric heater 12 turned on to melt the chocolate to the proper workable consistency. The candy-worker then takes up his or her position in front of the work-table and proceeds to dip the chocolate from the melting pot or receptacle 13 on to the slab 10, where the chocolate is worked in the usual manner, and the coated or fancy candies produced. The finished pieces are transferred to the tray 16 and as soon as the tray is filled, the front door 5 is opened, the filled tray placed therein and an empty tray removed and placed on the supporting frame 15. As soon as the storage compartment is filled with trays of finished chocolates, the rear door 6 is opened and the trays and chocolates removed therefrom, at which time they are ready for packing and shipping. It is to be noted that from the time the chocolate leaves the receptacle 13 until it is removed from the storage compartment 20, it has been worked and cooled at the proper and desired temperature to produce a product of fine texture, finish and absence from "bloom". When the chocolate is removed from the melting pot 13, it is placed on the cold working slab 10, which slab is maintained at a low temperature by reason of the underlying compartment 9 which contains ice or cooling coils. This cold slab enables the candy-maker to work up the chocolate coating for the fruit, nut or other centers on a cold slab, which assists materially in the manipulation. When the coating operation is finished, the candies are placed on the tray 16 which has also been cooled by previous storage in the compartment 20 and by reason of its superposed position with respect to the ice or coil compartment 14. When the trays of chocolates are placed within the storage compartment 20, they are further set or hardened in an absolutely dry, moisture-free and cold atmosphere, which produces a very desirable cooling or hardening action without the likelihood of the formation of "bloom" or gray coloring. Due to the provision of the relatively small ventilating holes 27 and 28 there is a slight circulation of air within the compartment 20, which assists in carrying off the small amount of heated air caused by the introduction of the chocolates into the compartment. The air around the sides of the cooling or storage compartment 20 circulates around the sides thereof and around and in direct contact with the cold or frosted surfaces of the compartment 14, such circulation being brought about by the provision of the ventilating holes 29 and 30 and by the natural tendency of cold air to descend. Thus the compartment 20 is at all times maintained at the proper temperature and the chocolates are set or hardened in a dry atmosphere, which has a very material advantage over the usual types of coolers, in which the air for cooling the chocolates is circulated in direct contact with ice or coils or in which the storage compartment has a side or sides in direct contact with the ice or cooling medium.

It is to be understood that the form of my invention herein shown and described is to be taken as a preferred example of the same, and that various changes in the shape, size and arrangement of parts may be resorted to without departing from the spirit of my invention or the scope of the subjoined claims.

Having thus described my invention, what I claim as new is:—

1. A combined chocolate work table and cooler comprising a cabinet, a refrigerant compartment positioned within said cabinet, a receiving tray positioned above the said compartment and on which the finished chocolates are placed, and a closed tray-storage compartment within the cabinet and spaced from the refrigerant compartment to permit air to circulate in contact with the outsides of said compartments to maintain the air within the tray-storage compartment in a dry, cold condition.

2. A combined chocolate work table and cooler comprising a cabinet, an open-topped refrigerant compartment positioned within said cabinet, a frame positioned above said compartment and adapted to support a candy-receiving tray above the open top of said compartment to cool the tray, and a closed tray-storage compartment within the cabinet and spaced from the refrigerant compartment to permit air to circulate in contact with the outsides of said compartments to maintain the air within the tray-storage compartment in a dry, cold condition.

3. A combined chocolate work table and cooler comprising a cabinet, a refrigerant compartment positioned within said cabinet near the top thereof, a candy working slab positioned above said compartment and adapted to be cooled thereby, and a closed candy storage compartment positioned within said cabinet and below said refrigerant compartment and spaced therefrom to permit air to circulate in contact with the outside of said compartments to maintain the air within the storage compartment in a dry, cold condition.

4. A candy work table comprising a refrigerant compartment arranged below the top surface of the table, a candy working slab positioned above said compartment, and a receiving tray positioned above said compartment, whereby the said slab and tray are cooled and maintained at a temperature to insure the proper working of the candy.

5. A candy work table comprising an open top frame work, a cover adapted to overlie said frame work, a refrigerant compartment carried by said cover, a candy working slab mounted on said cover above said compartment, and a receiving tray mounted on said cover above said compartment, whereby the said slab and tray are cooled and maintained at a temperature to insure the proper working and hardening of the candy.

6. A candy work table comprising an open top frame work, a removable cover adapted to overlie said frame work, a candy melting receptacle carried by the cover, a refrigerant compartment carried by said cover, a candy working slab mounted on said cover above the said compartment, and a receiving tray mounted on said cover above said compartment, the candy melting receptacle permitting the candy to be brought to the desired workable consistency and the cold working slab and tray permitting the proper working and hardening of the candy.

7. In a combined candy dipping table and cooler, the combination with an open top table, of a removable cover adapted to overlie said frame work, a refrigerant compartment carried by said cover, a drip tray secured below said compartment for collecting moisture condensing on the outer sides of said compartment, and means for draining said compartment and drip tray.

8. In a combined candy dipping table and cooler, the combination with an open top table, of a sheet metal cover adapted to overlie said table, a refrigerant compartment carried by said sheet metal cover, a candy working slab removably mounted on said cover above said compartment whereby the slab is cooled, and a closed candy storage compartment mounted on the table below the said refrigerant compartment and spaced therefrom to permit air to circulate in contact with the outside of said compartment to maintain the storage compartment in a dry, cold condition.

9. In a combined candy dipping table and cooler, the combination with an open top table, of a sheet metal cover adapted to overlie said table, a refrigerant compartment carried by said sheet metal cover, a candy working slab mounted on said cover above said compartment, a receiving tray mounted on said cover above said compartment, whereby the said slab and tray are cooled, and a closed candy storage compartment mounted in the table below the said refrigerant compartment and spaced therefrom to permit air to circulate in contact with the outside of said compartments to maintain the storage compartment in a dry, cold condition.

In testimony whereof I hereunto affix my signature.

JOE KORKAMES.